Patented Nov. 8, 1932

1,886,481

UNITED STATES PATENT OFFICE

MAX HARTMANN, HANS KAEGI, AND HANS ISLER, OF BASEL, SWITZERLAND, ASSIGNORS TO THE FIRM OF SOCIETY OF CHEMICAL INDUSTRY IN BASLE, OF BASEL, SWITZERLAND

UNILATERALLY ACYLATED DIAMINES AND PROCESS OF MAKING SAME

No Drawing. Application filed December 16, 1927, Serial No. 240,618, and in Switzerland and Germany November 7, 1927.

The present invention relates to the manufacture of unilaterally acylated diamines. It comprises the process of making these compounds, as well as the new products themselves.

It has been found that unilaterally acylated diamines of the general formula

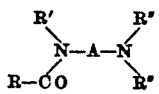

A representing an alkylene radical containing at least two carbon atoms, R meaning any hydrogenated or non-hydrogenated heterocyclic radical and R' and R'' meaning hydrogen or any monovalent radical, may be obtained by causing a heterocyclic compound of the formula:

R.CO.X

R meaning any hydrogenated or non-hydrogenated heterocyclic residue, and X meaning for instance OH, halogen or $OR_1$, $R_1$ being a monovalent alkyl radical, to react, if necessary, in the presence of an acid binding agent, with an alkylenediamine of the formula:

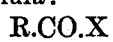

A representing an alkylene radical containing at least two carbon atoms, and R' and R'' meaning hydrogen or monovalent radicals. In the case where $R_2$ and $R_3$ are alkyl radicals the possibility of course is included that they may be directly linked together by their carbon atoms, as for instance in ω-amino-N-ethylpiperidine of the formula

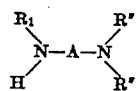

For the acylation there may be used either hydrogenated or non-hydrogenated heterocyclic carboxylic acids, or the halides or esters thereof. By heterocyclic carboxylic acids there are to be understood those containing for instance a pyridine, a quinoline, an isoquinoline, an acridine, a pyrazolone, or another heterocyclic ring. According to the invention the diamines acylated by non-hydrogenated heterocyclic carboxylic acids may be subsequently reduced if desired.

The bases produced by the invention form with acids salts soluble in water. They are characterized by the high degree of therapeutic activity. For example, 2-phenyl-4-quinolinecarboxylic acid diethylethylenediamine has the effect of depressing the blood pressure while tetrahydro-4-quinolinecarboxylic acid diethylethylenediamine has a pronounced effect upon the heart. The products therefore find application in therapy.

The following examples illustrate the invention, the parts being by weight:—

Example 1

150 parts of 2-phenyl-4-quinolinecarboxylic acid and 75 parts of unsymmetrical diethylethylenediamine are heated together in an autoclave at 180–200° C. The contents of the autoclave are dissolved in alcohol, the solution filtered and mixed with water until it begins to become turbid. The 2-phenyl-4-quinolinecarboxylic acid diethylethylenediamine of the formula

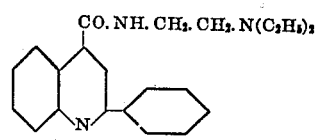

crystallizes in a short time in a form containing 2 molecules of water of crystallization which are easily lost when the crystals are heated in a vacuum. The anhydrous base is oily. The crystallized base melts at about 70–75° C. while becoming turbid. At 100° C. bubbles of vapour are evolved.

The monohydrochloride is colorless. The bihydrochloride is yellow and melts at 185–186° C. while decomposing. It also contains 2 molecules of water of crystallization.

Example 2

Equal parts of 2-phenyl-4-quinolinecarboxylic acid and ethylenediamine are heated together at 190–200° C. When the reaction is finished the excess of ethylenediamine is distilled and the residue extracted with dilute acetic acid. The monoacylethylenediamine is thus dissolved, while the symmetrical diacyl-derivative remains undissolved. The acetic acid solution is made alkaline with sodium carbonate and extracted with benzene. From the benzene solution there crystallizes the mono-2-phenyl-4-quinolinecarboxylic acid-ethylenediamide of the formula

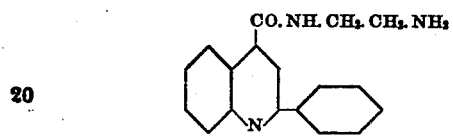

in the form of colorless crystals of melting point 124–125° C. This compound is sparingly soluble in water and ether; more freely soluble in benzene and insoluble in petroleum ether.

The dihydrochloride is very easily soluble in water.

Example 3

253 parts of 2-phenyl-1:2:3:4-tetrahydro-4-quinolinecarboxylic acid and 116 parts of unsymmetrical diethylethylenediamine are heated together at 200–220° C. The product is dissolved in ether and the solution is washed with water. From the ethereal solution a base, which is sparingly soluble in ether, crystallizes on standing in the form of fine slender needles which melt at 132° C. From the concentrated mother liquor there may be obtained another base easily soluble in ether and crystallizing in large glassy prisms of melting point 97.5° C. Both bases are apparently isomeric 2-phenyl-1:2:3:4-tetrahydro-4-quinolinecarboxylic acid-diethylethylenediamines of the formula

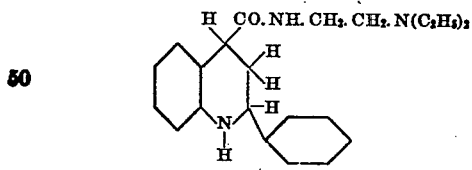

The bihydrochloride of the first base melts at 192° C. while decomposing; that of the second at 225° C. while decomposing.

Both bases may also be obtained by reducing the compound made as described in Example 1.

Example 4

253 parts of 2-phenyl-1:2:3:4-tetrahydro-4-quinolinecarboxylic acid and 144 parts of triethylethylenediamine are heated for some time to over 200° C. The product thus obtained is dissolved in ether and the solution is washed with water and soda. After evaporation of the solvent the 2-phenyl-1:2:3:4-tetrahydro-4-quinolinecarboxylic acid triethylethylenediamine of the formula

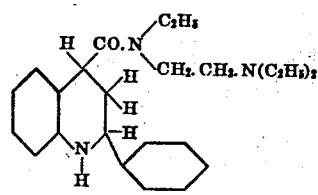

remains as a thick oil.

The salts of the base are easily soluble in water.

Example 5

Equal parts of 2-ethoxy-4-quinoline-carboxylic acid-ethylester and unsymmetrical diethylethylenediamine are heated in the oil bath to 130° C. The product is dissolved in ether, washed with water and neutralized by means of an acid. The base is precipitated by addition of sodium carbonate and is extracted by ether. The residue from the ether is re-crystallized from petroleum ether. The 2-ethoxy-4-quinolinecarboxylic acid diethylethylenediamine of the formula

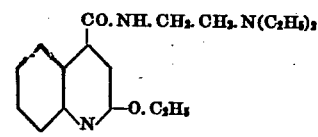

forms colourless crystals melting at 97° C. With acids it yields salts easily soluble in water.

Example 6

123 parts of 3-pyridinecarboxylic acid and 128 parts of ω-amino-N-ethylpiperidine are heated together in a vessel in an oil bath at 200° C. whereby water is evolved. The product is dissolved in alcohol and mixed with alcoholic hydrobromic acid. The hydrobromide of 3-pyridinecarboxylic acid-piperidine-N-ethylamine of the formula

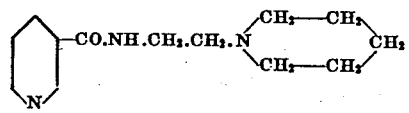

is crystallized from alcohol and re-crystallized from ethyl-acetate. It melts at 182–183° C. and dissolves easily in water.

Example 7

62 parts of 2-n-hexyl-β-benzo-γ-quinolinecarboxylic acid (Berichte 27, page 2022) and 100 parts of unsymmetrical diethylethylenediamine are heated together in an autoclave to 230–250° C. The product is dissolved in ether; the solution is washed and evaporated to dryness. The residue is dissolved in some acetone and mixed with alcoholic hydrochloric acid. The bihydrochloride of 2-n-hexyl-β-benzo-γ-quinoline-carboxylic acid-diethylethylenediamine of the formula

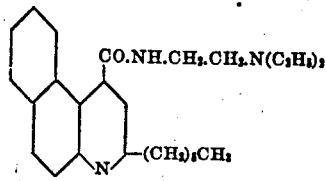

is precipitated in the form of a bright yellowish crystalline powder which melts at 274–275° C.

Example 8

9-acridinecarboxylic acid (meso-acridinecarboxylic acid) is converted into its chloride by means of phosphorus pentachloride and then mixed in toluene solution with an excess of unsymmetrical diethylethylenediamine. The mixture is extracted with dilute acid, the acid solution mixed with sodium carbonate in excess and the base extracted by means of ether. The 9-acridinecarboxylic acid-diethylethylenediamine of the formula

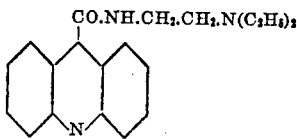

is purified by crystallization from benzene and forms pale yellow laminæ which melt at 105–106° C. It is freely soluble in ether and alcohol and sparingly soluble in petroleum ether and benzene.

The salts of the base are easily soluble in water.

Example 9

2 parts of 1:2:3:4-tetrahydro-9-acridinecarboxylic acid chloride (made from the acid by action of phosphorus pentachloride) are dissolved in toluene and the solution added drop by drop to a solution of 3 parts of triethylethylenediamine. The product is extracted by shaking with dilute acid, precipitated from the acid solution by means of sodium carbonate and extracted by ether. After the ether has been distilled there remains the 1:2:3:4-tetrahydro-9-acridinecarboxylic acid triethylethylenediamine of the formula

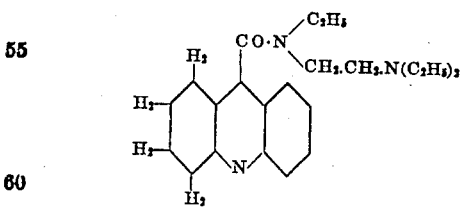

in the form of a yellow viscid oil of boiling point 189–191° C. at 0.015 mm. pressure. It is soluble freely in organic solvents, with the exception of petroleum ether.

Both the hydrochloride and the acetate are freely soluble in water.

Example 10

11.6 parts of 1-phenyl-5-pyrazolone-3-carboxylic acid-ethylester are heated in the oil bath with 12 parts of unsymmetrical diethylethylenediamine at 155–160° C. After cooling, the condensation product crystallizes in slender white needles, which are washed with water.

The hydrochloride of 1-phenyl-5-pyrazolone-3-carboxylic acid-diethylethylenediamine of the formula

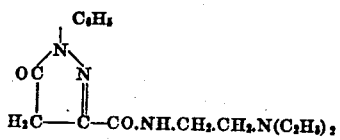

may be re-crystallized from alcohol and forms white crystals easily soluble in water and of melting point 220° C.

Example 11

10 parts of 5:6-methylenedioxy-8-phenyl-2:3-dihydro-2-isoquinolinecarboxylic acid-methyl-ester (melting point 140.5° C.) are boiled, together with 50 parts of unsymmetrical diethylethylenediamine, in a reflux apparatus so arranged that the methyl alcohol produced can be distilled off. The excess of diethylethylenediamine is distilled in a vacuum, the residue is dissolved in alcohol and mixed with an alcoholic solution of oxalic acid. The oxylate of the 5:6-methylenedioxy-8-phenyl-2:3-dihydro-2-isoquinolinecarboxylic acid-diethylethylenediamine of the formula

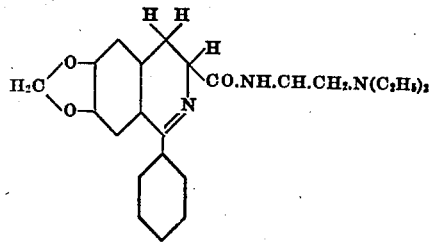

is precipitate as a yellow crystalline powder. After recrystallization from alcohol the product melts at 206–207° C.

All salts are colored strongly yellow.

The following table shows certain other bases which may be obtained according to the invention:—

| | |
|---|---|
| 1. 2-phenyl-4-quinolinecarboxylic acid piperidine-N-ethylamine | Hydrobromide: melting point 102° C. |
| 2. 2-phenyl-6-ethoxy-4-quinolinecarboxylic acid-diethylethylenediamine | Base: colorless crystals melting point 127–128° C. |
| 3. 4-quinolinecarboxylic acid-piperidine-N-ethylamine | Base: oily. |
| 4. 3-quinolinecarboxylic acid-diethylethylenediamine | Base: colorless crystals, boiling point 245° C. at 4 mm. pressure. |
| 5. 2-methoxy-4-quinolinecarboxylic acid-diethylethylenediamine | Base: colorless crystals, v melting point 94° C. |
| 6. 2:3-diphenyl-4-quinolinecarboxylic acid-diethylethylenediamine | Base: colorless needles, melting point 146–147° C. |

| | |
|---|---|
| 7. 2-β-phenylethyl-4-quinolinecarboxylic acid-diethylethylenediamine | Base: colorless crystals, melting point 98–99° C. |
| 8. 2-β-phenylethyl-4-quinoline-carboxylic acid-triethylethylenediamine | Base: oily, boiling point 187–188° C. at 0.007 mm. pressure. |
| 9. 2-styryl-4-quinolinecarboxylic acid-diethylethylenediamine | Base: colorless crystals, melting point 98–99° C. Hydrochloride: melting point 122° C. |
| 10. Tetrahydro-9-acridine-carboxylic acid-diethylethylenediamine | Base: colorless crystals, melting point 97–98° C. |
| 11. 9-acridinecarboxylic acid-diethylpentamethylene-diamine. | Base: yellowish crystals, melting point 84° C. |

What we claim is:

1. A process for the manufacture of unilaterally acylated diamines by causing a heterocyclic compound of the formula

R.CO.X

R meaning any hydrogenated or non-hydrogenated heterocyclic radical containing nitrogen in the heterocyclic nucleus, and X meaning OH, halogen or $OR_1$, $R_1$ being a monovalent alkyl radical, to react with an alkylene diamine of the formula

wherein A represents an alkylene radical containing at least two carbon atoms, R′ and R″ stand for hydrogen or ethyl, both R″ may also stand for an alkylene chain to form a piperidine ring, which products form with acids salts soluble in water.

2. A process for the manufacture of unilaterally acylated diamines by causing a heterocyclic compound of the formula

R.CO.X

R meaning any hydrogenated or non-hydrogenated heterocyclic radical containing a pyridine nucleus and X meaning OH, halogen or $OR_1$, $R_1$ being a monovalent alkyl radical, to react with an alkylene diamine of the formula

wherein A represents an alkylene radical containing at least two carbon atoms, R′ and R″ stand for hydrogen or ethyl, both R″ may also stand for an alkylene chain to form a piperidine ring, which products form with acids salts soluble in water.

3. A process for the manufacture of unilaterally acylated diamines by causing a heterocyclic compound of the formula

R.CO.X

R meaning any hydrogenated or non-hydrogenated heterocyclic radical containing a pyridine nucleus and X meaning OH, halogen or $OR_1$, $R_1$ being a monovalent alkyl radical, to react with an alkylene diamine of the formula

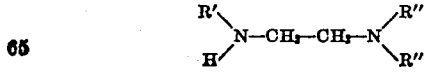

wherein R′ and R″ stand for hydrogen or ethyl, both R″ may also stand for an alkylene chain to form a piperidine ring, which products form with acids salts soluble in water.

4. A process for the manufacture of unilaterally acylated diamines by causing a heterocyclic compound of the formula

R.CO.X

R meaning any hydrogenated or non-hydrogenated heterocyclic radical containing a pyridine nucleus and X meaning OH, halogen or $OR_1$, $R_1$ being a monovalent alkyl radical, to react with an alkylene diamine of the formula

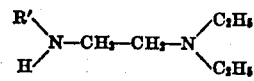

wherein R′ stands for hydrogen or ethyl, which products form with acids salts soluble in water.

5. As new products unilaterally acylated diamines of the formula

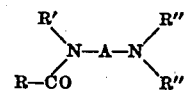

wherein R means any hydrogenated or non-hydrogenated heterocyclic radical containing nitrogen in the heterocyclic nucleus, A represents an alkylene radical containing at least two carbon atoms, R′ and R″ stand for hydrogen or ethyl, both R″ may also stand for an alkylene chain to form a piperidine ring, which products form with acids salts soluble in water.

6. As new products unilaterally acylated diamines of the formula

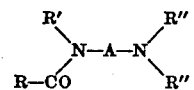

wherein R means any hydrogenated or non-hydrogenated heterocyclic radical containing a pyridine nucleus, A represents an alkylene radical containing at least two carbon atoms, R′ and R″ stand for hydrogen or ethyl, both R″ may also stand for an alkylene chain to form a piperidine ring, which products form with acids salts soluble in water.

7. As new products unilaterally acylated diamines of the formula

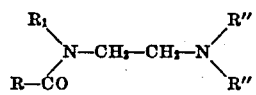

wherein R means any hydrogenated or non-hydrogenated heterocyclic radical containing a pyridine nucleus, R′ and R″ stand for hydrogen or ethyl, both R″ may also stand for an alkylene chain to form a piperidine ring, which products form with acids salts soluble in water.

8. As new products unilaterally acylated diamines of the formula

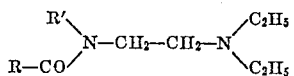

wherein R means any hydrogenated or non-hydrogenated heterocyclic radical containing a pyridine nucleus and R' stands for hydrogen or ethyl, which products form with acids salts soluble in water.

In witness whereof we have hereunto signed our names this 5th day of December, 1927.

MAX HARTMANN.
HANS KAEGI.
HANS ISLER.